Oct. 19, 1954    H. P. SCHICK ET AL    2,691,916
PROJECTOR
Filed Aug. 3, 1950    3 Sheets-Sheet 1
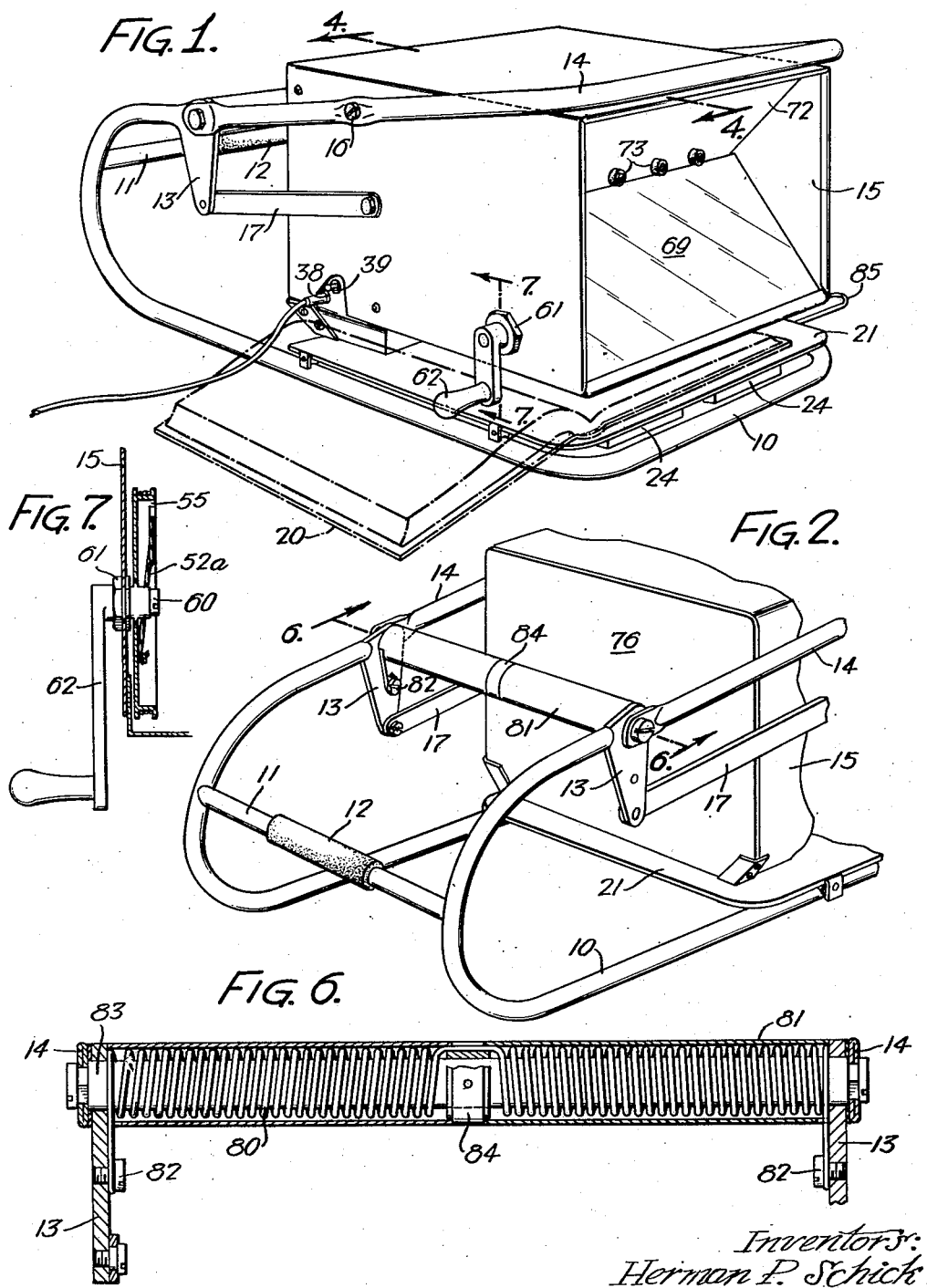

Oct. 19, 1954   H. P. SCHICK ET AL   2,691,916
PROJECTOR
Filed Aug. 3, 1950   3 Sheets-Sheet 2
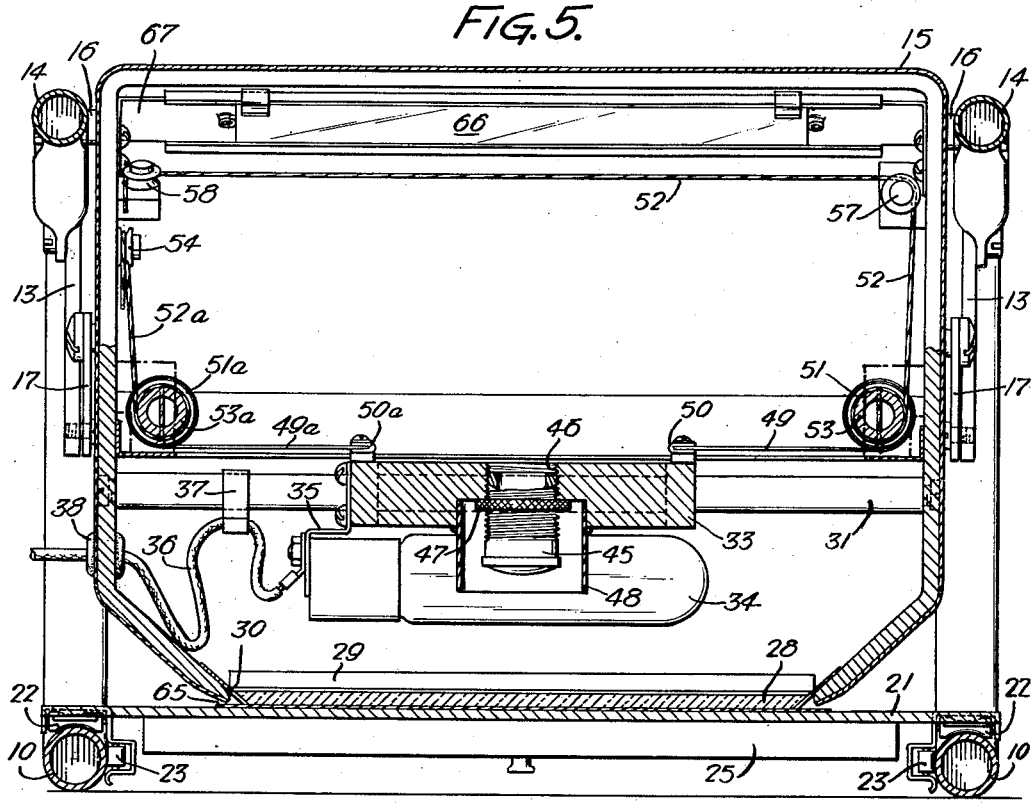
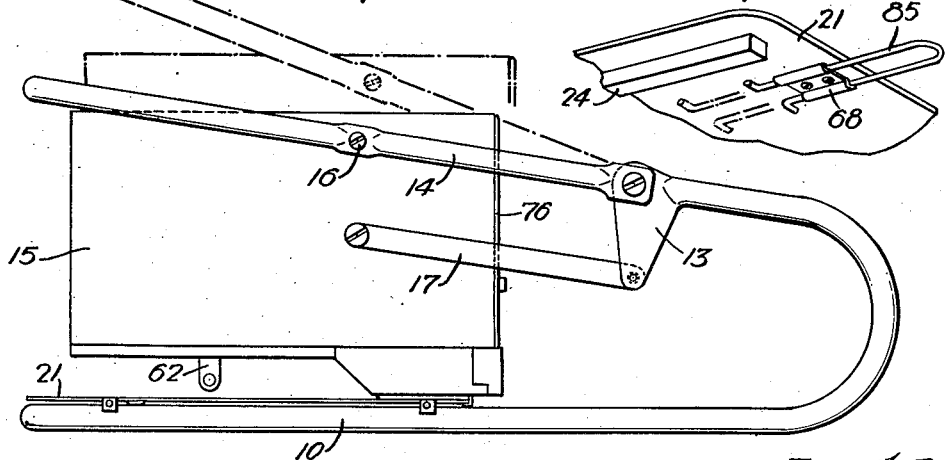
Inventors:
Herman P. Schick
Wallace E. Frank
by their Attorneys
Howson & Howson Oct. 19, 1954  H. P. SCHICK ET AL  2,691,916
PROJECTOR
Filed Aug. 3, 1950  3 Sheets—Sheet 3

Inventors:
Herman P. Schick
Wallace E. Frank
by their Attorneys
Howson & Howson

Patented Oct. 19, 1954

2,691,916

UNITED STATES PATENT OFFICE 2,691,916

PROJECTOR

Herman P. Schick, Philadelphia, and Wallace E. Frank, Merion, Pa., assignors to W. K. Kellogg Foundation, Battle Creek, Mich., a corporation of Michigan Application August 3, 1950, Serial No. 177,504

8 Claims. (Cl. 88—24)

This invention relates to projectors and more particularly to an improved magnifying projector for books, manuscripts, and the like.

The present apparatus is characterized by its compact, lightweight construction and ease of manipulation. It incorporates a source of illumination and lens which may be moved laterally in the projector to follow the subject matter being projected and enlarged. The housing of the projector is counterbalanced to permit easy movement of the subject matter and a transparent flat sheet of glass or similar material is incorporated in the housing to hold the sheet or page flat, thereby eliminating distortion and inaccurate projection. The illuminating source and lens are shielded and positioned close to the subject matter by means of a carriage which may be actuated from a convenient position by the operator.

A primary object therefore of the invention, is to provide a rugged, compact projector housing which is vertically movable with respect to a table, so that the article to be projected can be conveniently positioned on the table and thus lightly compressed between the bottom of the housing and the table.

A further object of the invention is to provide an illuminating source and a lens, both of which are mounted on a carriage actuated by suitable means from a remote station.

A further object is to provide a bottom surface for a projector of the type described herein, which enables undistorted projection of the printed page of a book by providing means for retaining the page of a book relatively flat and eliminating the interference which might otherwise be occasioned due to the binding.

A further object of the invention is to provide suitable means, in a projector of the type described herein, for scanning the subject matter without the necessity of refocusing the projector.

Further objects will be apparent from the specification and drawings in which:

Fig. 1 is a perspective of a projector constructed in accordance with the present invention;

Fig. 2 is a fragmentary perspective showing the rear supporting structure of our projector;

Fig. 3 is a side view of the structure of Fig. 1;

Fig. 5 is a transverse section as seen at 5—5 of Fig. 4;

Fig. 6 is an enlarged sectional detail as seen at 6—6 of Fig. 2;

Fig. 7 is an enlarged sectional detail as seen at 7—7 of Fig. 1; and

Fig. 8 is a fragmentary perspective showing a portion of the underside of the movable table.

Figure 4:
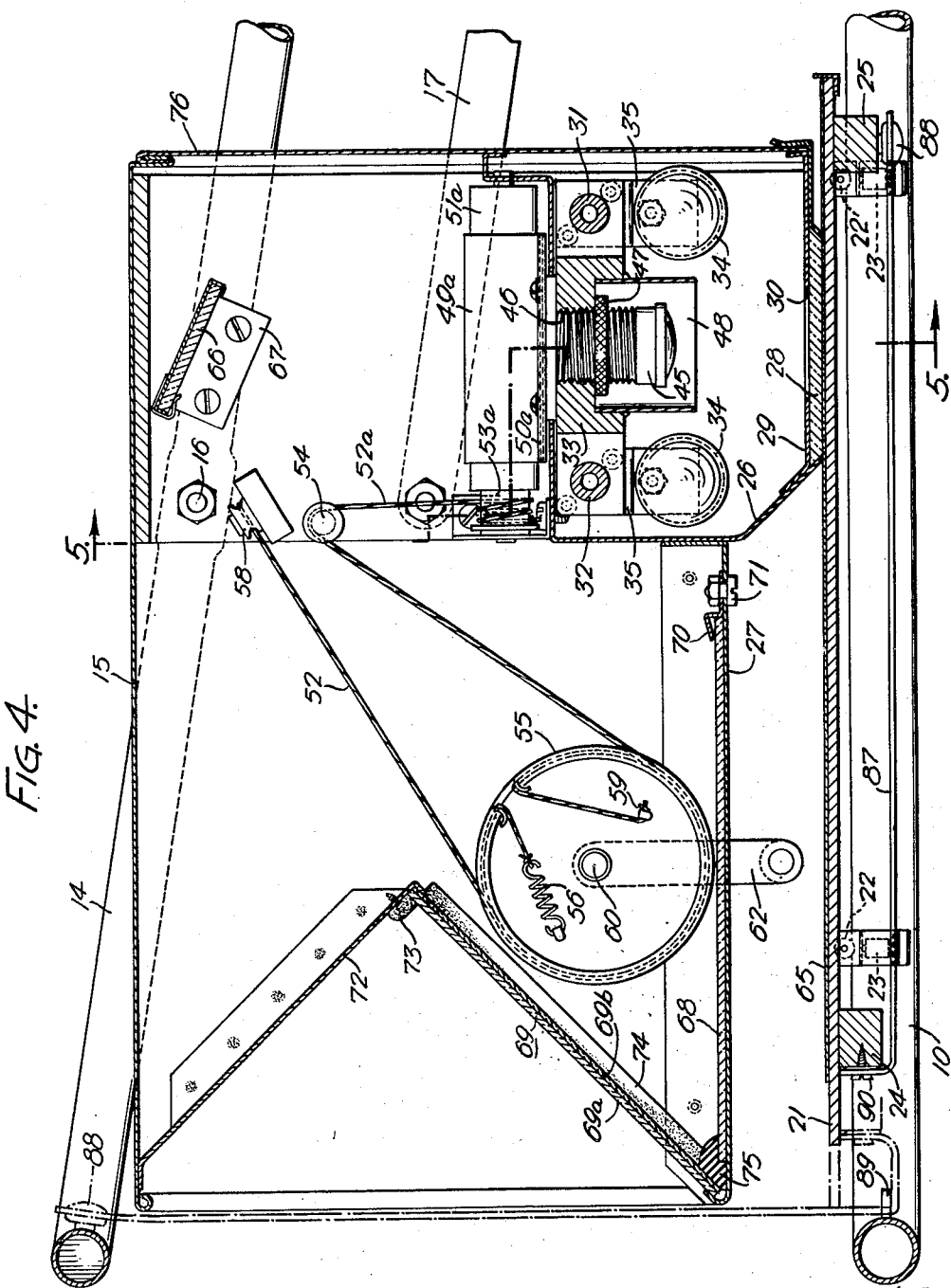
Fig. 4 is a longitudinal section as seen at 4—4 of Fig. 1.

The present projector comprises essentially a tubular framework having a relatively stationary base, and an upper yoke or handle pivotally secured to the base. The yoke supports the projector housing which includes at one end thereof, near the bottom, a flat transparent plate. Closely spaced above the transparent plate, we provide a source of illumination and a lens, both of which are mounted on a carriage in the housing. A flexible fabric-like opaque mask is secured to the carriage in such a way that no light can leak past the mask when the carriage is moved on the rails. A cable threaded over suitable pulleys and connected to a crank-actuated drum accessible to the operator, actuates the carriage through the mask. The image of the subject matter to be projected is reflected from a pair of mirrors in the housing and from thence onto a ground or etched screen at the front of the housing. The lower framework also carries a table which is readily movable longitudinally on the framework by means of rollers so that the subject matter may be continuously advanced as the operator desires, to a projecting position under the lens.

Referring now more particularly to the drawings, the tubular lower framework 10 of the projector forms the general supporting structure for the entire device. At the rear of the projector, the framework is bent upwardly and forwardly as shown in Fig. 2. A cross member 11 connects opposite reaches of the framework and is provided with a suitable carrying grip 12. The upper ends of framework 10 are provided with a pair of downwardly depending brackets 13, 13 to the upper ends of which yoke 14 is journaled. The projector housing 15 is pivotally suspended on yoke 14 at 16, 16 and the housing 15 is retained in a position parallel to the plane of lower framework 10 by links 17, 17 pivoted on either side of the housing and to the lower extremities of brackets 13, 13, thus forming a parallelogram. The subject matter to be projected, for example a book 20, is positioned on a table 21 longitudinally movable on framework 10 by means of rollers 22, 22 and laterally retained on the framework by side rollers 23, 23 (Fig. 5). Transverse battens 24 and 25 secured to the underside of table 21, serve to reenforce the table and also act as limit stops for fore and aft movement of the table.

The projector housing 15 incorporates at the lower rear portion thereof, a lamp housing 26 which depends substantially below the bottom 27 of the forward part of the housing. A transparent flat plate 28 of glass or other similar material, is secured to the bottom of housing 26 (as shown in Figs. 4 and 5), and the bottom supporting sheet 29 of housing 26 is transversely apertured at 30 to permit passage of light rays to the surface of the sheet or book. The rails 31 and 32 are secured transversely in the upper part of lamp housing 26 and serve to support a carriage assembly 33. The source of illumination for the projector consists of a pair of electric lamps 34, 34 which are suspended by brackets 35, 35 from one end of carriage 33. A suitable electrical lead 36 for the lamps is retained in an elevated position by clip 37 slidably secured to one of the rails 31. Lead 36 runs through a grommet 38 in one side of the lamp housing and a convenient toggle switch 39 for the lamps is mounted on the side of housing 15. A lens 45 is supported in carriage 33 and it will be noted from Figs. 4 and 5 that the lens 45 is centrally positioned in the carriage so that it traverses aperture and registers with an upper aperture 46 in the carriage. The lens 45 is externally threaded to permit focusing and a lock nut 47 serves to retain it in any desired vertical adjustment. A circular shield or shade 48 prevents direct light rays from lamps 34, 34 from entering the lens.

The carriage 33 is impelled transversely back and forth along rails 31 and 32 by means of fabric masks 49, 49a of opaque material attached to the carriage by means of clamp brackets 50, 50a. The attachment between mask 49 and clamp 50 urges carriage 33 to the right (as seen in Fig. 5), whereas mask 49a is effective to propel the carriage in the opposite direction through clamp 50a. Mask 49 is wound around drum 51 and correspondingly, mask 49a is wound around drum 51a. The drums 51, 51a are simultaneously turned in the same direction by means of a pair of cords or cables 52, 52a which are wound around the shafts 53, 53a of each drum and anchored thereto. At one side of the housing, cable 52a runs from drum 51a over pulley 54 and thence onto a control reel 55 to which it is resiliently anchored by means of an extension spring 56. The other cable 52 runs from the opposite drum 51 over a pulley 57 to the top of the housing, thence laterally across the housing to a pulley 58 to the opposite side of reel 55, to which it is likewise anchored at 59. The shaft 60 on which reel 55 is journaled extends through housing 15 to which it is secured by means of nut 61. Reel 55 is provided with a crank 62 so that when the crank 62 is turned by the operator, cables 52, 52a simultaneously turn drums 51, 51a in the same direction to slide carriage 33 back and forth on rails 31, 32 in accordance with the movement of crank 62. In this way it is possible to position the source of illumination as well as the magnifying lens 45 very close to the subject matter being projected, for example the book 20 or sheet 65.

Light rays emanating from lamps 34, 34 are reflected from the upper surface of sheet 65 through plate 28 and lens 45. From thence they are focused on a mirror 66 supported in bracket 67 near the top of housing 15. From mirror 66 the light rays are directed to a second larger mirror 68 secured in the bottom of the front portion of the housing, and from thence they impinge upon the screen 69. Mirror 68 is retained in housing 15 by means of brackets 70 secured to the housing by bolts 71, 71. Screen 69, if desired, may be a Fresnel lens having an etched upper surface, or it may be of laminated construction using a sheet of ground glass 69a secured to a Fresnel lens 69b made of a synthetic plastic material such as methyl methacrylate. The screen 69 is supported and sealed on its top edge by means of a sheet metal plate 72 and rubber containing portions 73, 73. Suitable rubber strips 74, 75 seal and support the opposite edge of screen 69 as well as the forward edge of mirror 68.

Access to lamps 34, 34 and lens 45 is provided through the slidably removable rear cover 76 of the housing.

The weight of the entire housing 15 and yoke 14 is conveniently counterbalanced by means of a torsion spring 80 enclosed within a tubular housing 81 connecting brackets 13, 13. Torsion spring 80 is reverse wound and anchored to brackets 13 at either end by means of cap screws 82, 82. The center of spring 80 is anchored to shaft 83 by means of collar 84 so that when yoke 14 is raised and lowered, the spring 80 is either deenergized or energized as the case may be.

In operation, the book or manuscript to be projected is placed on table 21 (as shown in Figs. 1 and 4) and the housing gently lowered against the torsion of spring 80 until plate 28 lightly rests against the page of the book or sheet. This insures that the sheet is retained in a flat position so that an undistorted image can be projected. With the lamps 34, 34 illuminated, the operator manipulates crank 62 to cause carriage 33 to traverse rails 31 and 32, thus scanning the book or page transversely and projecting an enlarged image of the page onto screen 69. Slight longitudinal pressure on handle 85 (Fig. 8) which is slidably secured to the underside of table 21 by means of bracket 68, serves to move table 21 on its rollers 22, 22 to permit longitudinal scanning of the page. It will be understood that the longitudinal and transverse scanning operations may be performed concurrently or intermittently, as desired by the operator.

The weight of the housing and the yoke is not completely counterbalanced by spring 80 so that there is a slight residual pressure on the sheet or page, sufficient to retain the page flat. However, this pressure does not interfere with any desired longitudinal movement of table 21.

When the projector is to be transported or carried manually, we provide a safety strap 87 which may be removed from the normal operating position shown in full lines in Fig. 4, to the broken line position in which the snap fastener 88 on the strap is detached from the rear batten 25 and the strap engaged with a hook 89 on frame member 10 which directs the strap upwardly across the front of housing 15 so that snap fastener 88 may be secured to the front cross member of yoke 14. In this position the strap not only prevents relative movement of the yoke and housing with respect to the frame 10, but also anchors the table 21 since the opposite end of the strap is secured to batten 24 by means of a screw 90.

It will thus be understood that we have provided a projector that is lightweight and therefore readily portable, and which enables extremely satisfactory results to be achieved due to the counterbalancing of the housing and the light pressure that may be used to keep the subject matter flat and undistorted.

Having thus described our invention, we claim:

1. A projector assembly comprising a framework, a yoke pivotally supported on said framework in an elevated position, a housing pivotally suspended from said yoke means including a counter-balance for holding the housing in any desired pivotal position, a table movable on the framework generally positioned under said housing, transparent means at the bottom of the housing for lightly pressing against an object on the table, a source of illumination in the housing above said transparent means, a lens in the housing positioned adjacent said source of illumination, a screen on said housing, and means for directing an enlarged image of said object onto the screen through the lens.

2. A projector assembly comprising a framework, a housing pivotally suspended from said framework means including a counter-balance for holding the housing in any desired pivotal position, a table on the framework generally positioned under said housing, transparent means at the bottom of the housing for lightly pressing against an object on the table, a source of illumination in the housing above said transparent means, a lens in the housing positioned adjacent said source of illumination, a screen on said housing, and means for directing an enlarged image of said object onto the screen through the lens.

3. A projector assembly comprising a framework, a housing pivotally suspended from said framework means including a counter-balance for holding the housing in any desired pivotal position, a table on the framework generally positioned under said housing, means for moving the table on the framework, a transparent flat plate secured in the bottom of the housing for lightly compressing an object between the plate and the table, a source of illumination in the housing above said plate, a lens in the housing positioned adjacent said source of illumination, a screen on said housing, and means for directing an enlarged image of said object onto the screen through the lens.

4. A projector assembly comprising a framework, a yoke pivotally supported on said framework in an elevated position, means for counterbalancing said yoke, a housing pivotally suspended from said yoke, linkage for maintaining said housing in a substantially horizontal position when the yoke is pivoted with respect to the framework, a table on the framework generally positioned under said housing, means for moving said table on the framework, a transparent flat plate secured in the bottom of the housing for lightly compressing an object between the plate and the table, a rail transversely mounted in said housing in vertical spaced relation to said plate, a source of illumination carried by the carriage, a lens carried by the carriage, a shield between said lens and said source of illumination, a mask attached to each end of the carriage and extending transversely across the housing, a roller at each end of the housing on which opposite extremities of said mask are selectively rolled, a crank on the outside of the housing, a flexible connection between the crank and the rollers, whereby turning of the crank slides the carriage back and forth on the rail, a screen in said housing, and means for directing an enlarged image of said object through the carriage and lens onto the screen.

5. A projector assembly comprising a framework, a yoke pivotally supported on said framework in an elevated position, means for counterbalancing said yoke, a housing pivotally suspended from said yoke, linkage for maintaining said housing in a substantially horizontal position when the yoke is pivoted with respect to the framework, a table on the framework generally positioned under said housing, means for moving said table on the framework, a transparent flat plate secured in the bottom of the housing for lightly compressing an object between the plate and the table, a rail transversely mounted in said housing in vertical spaced relation to said plate, a source of illumination carried by the carriage, a lens carried by the carriage, a shield between said lens and said source of illumination, a mask attached to each end of the carriage and extending transversely across the housing, a roller at each end of the housing on which opposite extremities of said mask are selectively rolled, a crank on the outside of the housing, a flexible connection between the crank and the rollers, whereby turning of the crank slides the carriage back and forth on the rail, a screen in said housing, means for directing an enlarged image of said object through the carriage and lens onto the screen, and means for locking the table on the framework.

6. In projection apparatus the sub-combination which comprises a housing, a transparent plate at the bottom of said housing, at least one transverse rail in said housing in vertical spaced relationship to said plate, a carriage movable on said rails, a source of illumination carried by said carriage, a lens mounted on said carriage, means for reciprocating said carriage back and forth on the rails, at least one reflector positioned to direct light rays from the lens to a remote location in the housing, and a screen for intercepting said light rays.

7. A projector assembly comprising a framework, a housing suspended from said framework, means secured in the bottom of the housing for flattening an object to be projected, a carriage transversely movable in the housing, a mask connected to said carriage, means for moving the carriage in the housing to scan an object, a source of illumination in the housing mounted on the carriage in spaced relation to said flattening means, a lens in the housing mounted on the carriage adjacent said source of illumination, a screen in said housing, and means for directing an enlarged image of said object onto the screen through the lens.

8. A projector assembly comprising a framework, a housing suspended from said framework, means secured in the bottom of the housing for flattening an object to be projected, a source of illumination in the housing in spaced relation to said flattening means, a lens in the housing mounted adjacent said source of illumination, a screen in said housing, means for directing an enlarged image of said object onto the screen through the lens, a carriage transversely movable in the housing, at least one rail on which said carriage is supported, the source of illumination and the lens being mounted on the carriage, a drum pivotally mounted adjacent each terminus of the rail, a mask attached to each end of the carriage and extending in opposite directions around the drums, and means for simultaneously turning the drums in the same direction to slide the carriage back and forth on the rail.

References Cited in the file of this patent

UNITED STATES PATENTS

| Number | Name | Date |
|---|---|---|
| 1,218,749 | Deming | Mar. 13, 1917 |
| 1,966,261 | Petit | July 10, 1934 |
| 2,047,002 | Cantwell | July 7, 1936 |
| 2,208,725 | Homrich | July 23, 1940 |
| 2,301,675 | Arndt | Nov. 10, 1942 |

FOREIGN PATENTS

| Number | Country | Date |
|---|---|---|
| 55,363 | Sweden | Apr. 8, 1922 |